United States Patent [19]
Hodge et al.

[11] Patent Number: 5,230,275
[45] Date of Patent: Jul. 27, 1993

[54] ECCENTRIC ANTI-FRICTION DRIVE FOR FLUID POWER APPARATUS

[75] Inventors: Bobby L. Hodge, Charlotte, N.C.; Wolfgang Pflugner, Herzogensurach/Bayern, Fed. Rep. of Germany

[73] Assignees: INA Waelzlager Schaffler KG, Fed. Rep. of Germany; INA Bearing Co., Inc., Fort Mill, S.C.

[21] Appl. No.: 783,331

[22] Filed: Oct. 28, 1991

[51] Int. Cl.$^5$ .................................... F01B 7/04
[52] U.S. Cl. ................................ 92/68; 92/72; 91/491; 417/273; 384/559; 384/569; 384/585; 29/898.066; 29/898.062
[58] Field of Search ............ 92/68, 72; 91/491; 417/273; 384/454, 548, 559, 561, 569, 584, 585, 903; 403/289; 29/898.062, 898.066; 566/566

[56] References Cited

U.S. PATENT DOCUMENTS

| | | | |
|---|---|---|---|
| 976,476 | 11/1910 | Lockwood | 384/584 |
| 1,387,638 | 8/1921 | Bingham | 29/898.066 |
| 1,479,313 | 1/1924 | Pallavicini . | |
| 2,543,796 | 3/1951 | McGee | 417/273 |
| 3,424,507 | 1/1969 | Rollins et al. | 384/454 |
| 3,635,103 | 1/1972 | Monti . | |
| 3,865,437 | 2/1975 | Crosby | 403/289 X |
| 3,977,741 | 8/1976 | Lundberg | 384/569 |
| 4,035,044 | 7/1977 | Miyazaki . | |
| 4,640,632 | 2/1987 | Brandenstein et al. . | |
| 4,657,414 | 4/1987 | Stella | 384/548 |

FOREIGN PATENT DOCUMENTS

| | | | |
|---|---|---|---|
| 445542 | 6/1927 | Fed. Rep. of Germany | 384/584 |
| 668036 | 11/1938 | Fed. Rep. of Germany | 384/585 |
| 936965 | 1/1956 | Fed. Rep. of Germany | 384/584 |
| 2654203 | 6/1978 | Fed. Rep. of Germany | 384/569 |
| 3400633 | 7/1985 | Fed. Rep. of Germany | 29/898.066 |
| 46507 | 7/1936 | France | 384/559 |
| 117724 | 5/1991 | Japan | 384/569 |

Primary Examiner—Edward K. Look
Assistant Examiner—Todd Mattingly
Attorney, Agent, or Firm—Wigman, Cohen, Leitner & Myers

[57] ABSTRACT

An eccentric anti-friction drive for fluid power apparatus is disclosed wherein the eccentric element comprises a tubular cup or sleeve made by deep drawing a hardenable steel material. The eccentric element comprises two cylindrical peripheries disposed eccentrically with respect to one another. One of the cylindrical peripheries is fitted to the rotating member of a prime mover and the other cylindrical periphery comprises the inner or outer race of an anti-friction bearing of the anti-friction drive.

15 Claims, 2 Drawing Sheets

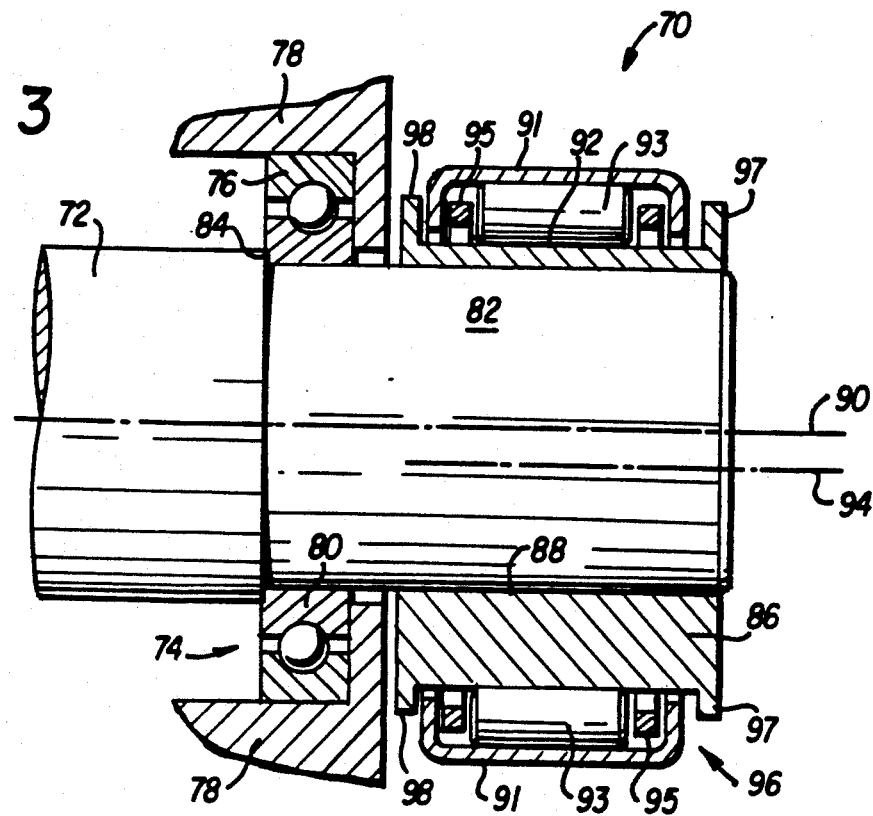
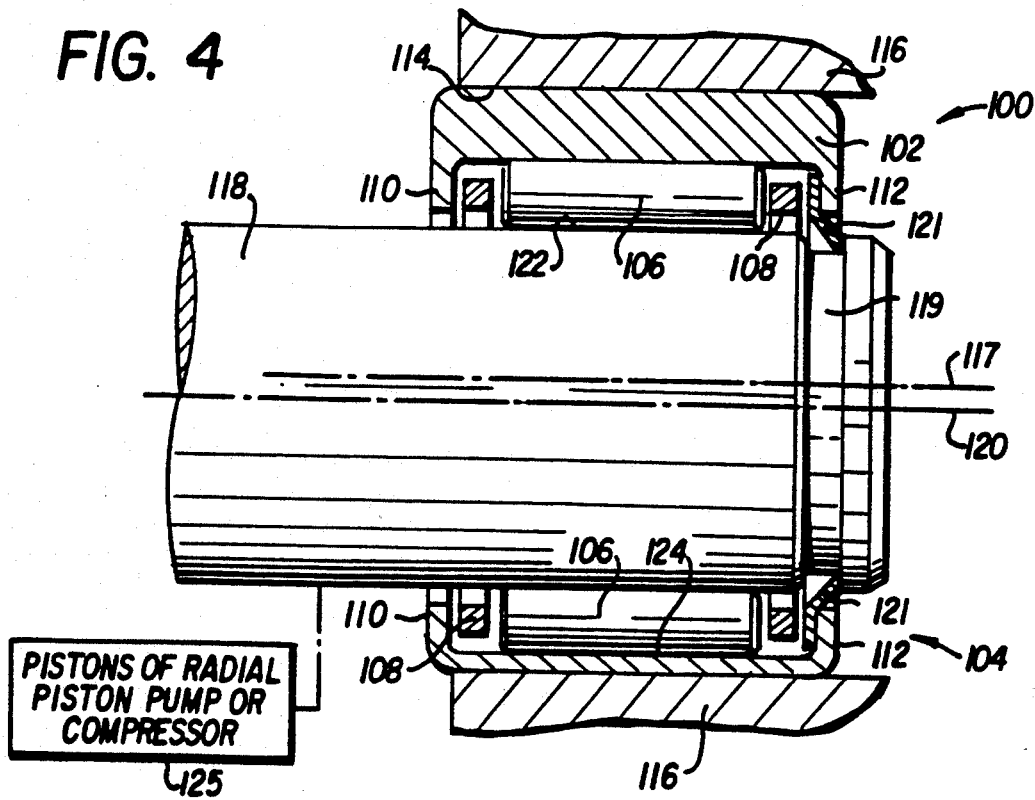

ECCENTRIC ANTI-FRICTION DRIVE FOR FLUID POWER APPARATUS

FIELD OF THE INVENTION

The present invention relates to fluid power apparatus, and more particularly to an eccentric anti-friction drive means for radial piston pumps and compressors used to generate hydraulic or pneumatic fluid pressure.

DESCRIPTION OF THE PRIOR ART

In the fluid power field, a prime mover, such as an electric motor or internal combustion engine, is used to impart rotary motion to a shaft. An eccentric mechanism with an anti-friction bearing is conventionally employed to convert the rotary shaft motion to linear motion of a radial piston or pistons and the piston linear motion is used to pump and/or compress a fluid. Typically, the eccentric anti-friction drive mechanism is provided by installing an intermediate eccentric ring on the rotary shaft, the ring being either machined from a casting or made from a sintered metal sleeve. Alternatively, the eccentric drive mechanism can be machined directly into the body of the rotary shaft of the prime mover.

In the case of an intermediate eccentric ring, a substantial weight is normally added to the rotary shaft assembly necessitating the use of a counterweight to balance the eccentric forces on the rotary shaft of the prime mover. In addition, the intermediate eccentric is quite expensive in that it must be additionally processed by machining, grinding or the like to maintain the accuracies required for installation of anti-friction bearings on the eccentric. In some cases, inner rings and secondary housings are required to provide a suitable raceway for an anti-friction bearing because typical cast or sintered materials are usually not suitable for use as an anti-friction bearing raceway.

In those constructions wherein the eccentric is machined directly into the rotary shaft of the prime mover, the shaft must be made of a premium quality material solely for the reason that the machined eccentric has to be hardened to perform satisfactorily as a bearing race. Thus, the cost of the shaft is substantially increased despite the fact that only a portion of the shaft needs to be hardened. It is, of course, known to use a hardenable or hardened sleeve or inner bearing race on the eccentric machined on the rotary shaft. That approach still necessitates machining the shaft and fitting the bearing sleeve to the shaft, and may even require a larger shaft diameter than would otherwise be required.

In view of the aforementioned shortcomings of the prior art eccentric mechanisms, it would be desirable to provide an eccentric anti-friction drive mechanism on a rotary shaft which eliminates the need for any machining of the shaft or intermediate pieces and permits the shaft to be made of materials that are of less than bearing ring or race quality.

SUMMARY OF THE INVENTION

The present invention overcomes the limitations and disadvantages of the prior art eccentric drive mechanisms by the use of a shaft extension or a bearing ring or sleeve made by deep drawing a steel material that is suitable for use in anti-friction bearing race components. In one embodiment, a tubular shaft extension is deep drawn from a steel blank to form a deep drawn cup having two different, eccentric diameters. The steel material from which the cup is drawn is hardenable and is suitable for making bearing race components, such as inner and outer races.

The larger diameter portion of the cup is fitted onto the end of the rotary shaft and is coaxial with the shaft. That portion of the cup having the smaller diameter extends beyond the end of the shaft and is eccentric thereto. An anti-friction bearing is fitted onto the exterior of the smaller diameter cup portion such that the bearing rollers bear directly on the surface of the deep drawn cup. The anti-friction bearing may be retained on the eccentric portion by any suitable means, such as a retaining washer made integral with the bearing, or a retaining cap that attaches to the free end of the deep drawn cup.

In other embodiments of the invention, the eccentric drive is provided by a deep drawn steel sleeve having eccentric inner and outer cylindrical surfaces. The sleeves of these embodiments can be used as an eccentric inner race mounted on one end of a rotary shaft or as an eccentric outer race for use in a construction that employs rotating outer race and a non-rotating shaft which is eccentrically orbited to operate the pistons of a piston pump or compressor. In the latter construction, if the shaft is made of a material of sufficient quality to be used as a bearing race, the anti-friction bearing rollers can bear directly upon the periphery of the eccentrically orbited shaft.

The present invention advantageously provides an eccentric drive means that is a particularly economical solution for providing an eccentric anti-friction drive for radial piston pumps and compressors.

With the foregoing and other advantages and features of the invention that will become hereinafter apparent, the nature of the invention may be more clearly understood by reference to the following detailed description of the invention, the appended claims and to the several views illustrated in the drawings.

BRIEF DESCRIPTION OF THE DRAWINGS

FIG. 3 is a fragmentary cross-sectional view of an alternate embodiment of an eccentric drive mechanism according to the invention; and FIG. 4 is a fragmentary cross-sectional view of a further embodiment of an eccentric drive mechanism according to the invention.

DETAILED DESCRIPTION OF THE INVENTION

Figure 1:
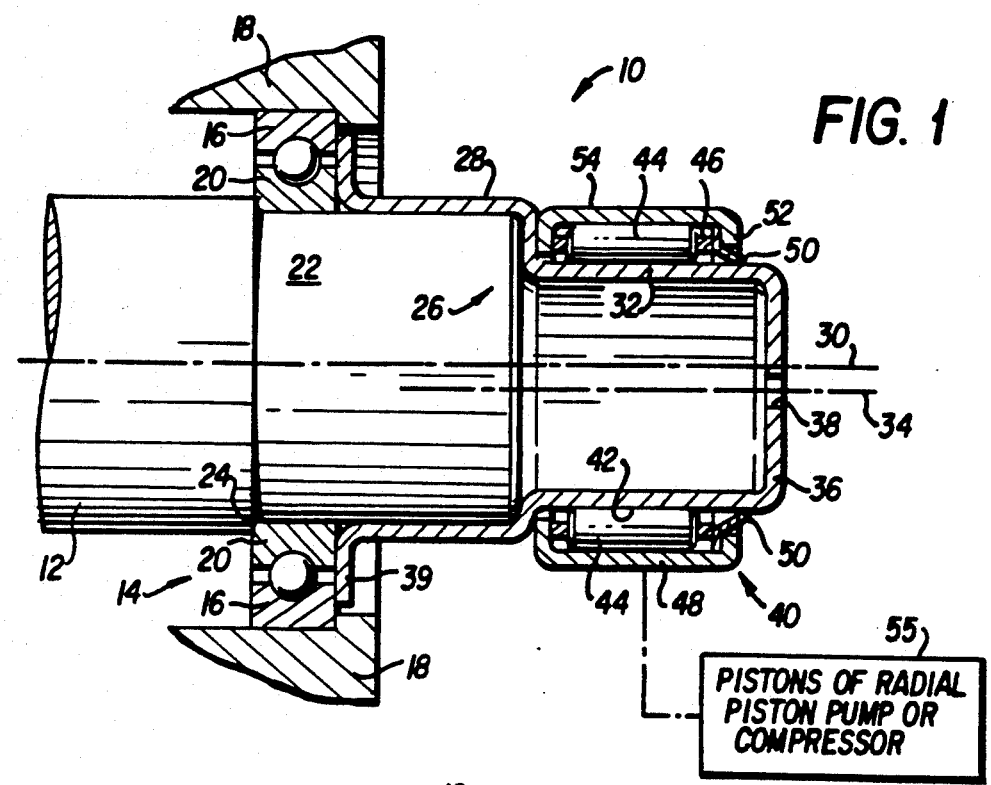
FIG. 1 is a fragmentary cross-sectional view of an eccentric shaft extension according to the present invention.

Referring now to the drawings wherein like parts are designated by like reference numerals, there is illustrated in FIG. 1 a first embodiment of the eccentric drive means of the invention which is designated generally by reference numeral 10. Eccentric drive means 10 is mounted to a shaft 12 of a prime mover (not shown), such as an electric motor or internal combustion engine. Shaft 12 is rotatably supported in an anti-friction bearing 14, such as a ball bearing, the outer race 16 of which is mounted in a bearing block or housing 18. The inner race 20 of bearing 14 is press fit onto a reduced diameter portion 22 of shaft 12 and bears against an annular shoulder 24 of the shaft.

An eccentric shaft extension 26 having a relatively thin wall and comprising a cup-like component deep drawn from a hardenable steel blank is press fit over the shaft portion 22. If desired, a retaining pin, such as a roll pin, or other securement means (not shown) may be used to secure the first tubular portion 28 to the reduced diameter portion 22 of the shaft 12. The shaft extension 26 comprises a first tubular portion 28 having a first axis 30 and a second tubular portion 32 having a second axis 34 offset from the first axis 30 so that the second tubular portion 32 is eccentric to the first tubular portion 28. The second tubular portion 32 has an end plate 36 which may be provided with an axial hole 38. A flange 39 extends from the free end of the first tubular portion 28 and bears against the annular face of bearing 14.

An anti-friction roller bearing 40 is mounted on the surface 42 of the second tubular portion 32 such that surface 42 comprises the inner bearing race of bearing 40. Bearing 40 comprises a plurality of roller bearings 44 supported in a cage or retainer 46 and has an outer race 48. A spring clip retaining washer 50 is provided between the bent tab or flange 52 of the outer race for retaining the bearing 40 on the second tubular portion 32 of the eccentric drive means 10.

It will be understood by those skilled in the art that rotation of shaft 12 about its axis 30 will cause the second tubular portion 32 and the bearing 40 to rotate eccentrically. Thus, the outer periphery 54 of the outer race 48 may be used to reciprocate a plurality or radial pistons of a radial piston pump or compressor 55 used to generate hydraulic or pneumatic fluid pressure.

Figure 2:
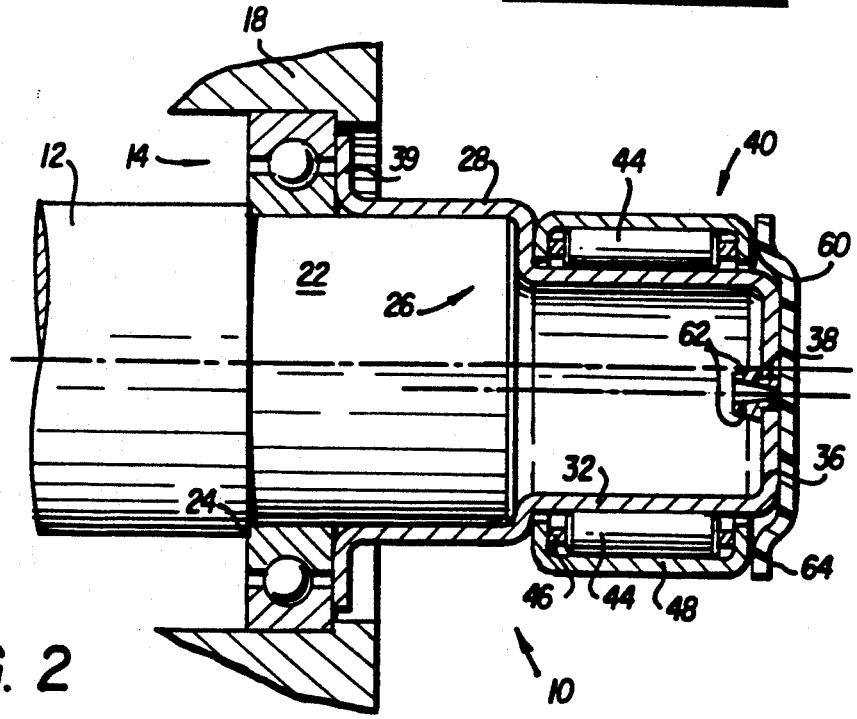
FIG. 2 is a fragmentary cross-sectional view of an alternate embodiment of a bearing retainer for use with the eccentric shaft extension according to the invention.

FIG. 2 illustrates another eccentric drive means 10 which is substantially identical to the eccentric drive means 10 of FIG. 1 except for the mechanism used to retain the bearing 40 on the second tubular portion 32 of the eccentric drive. In this embodiment, the retainer 50 is replaced by a retaining cap 60 molded of a plastic material. Cap 60 has a pair of resilient locking fingers 62 which pass through hole 38 in the end cover 36 of the second tubular portion 32 and engage on the inner surface of the end cover. An annular retaining lip 64 extends radially beyond end cover 36 and retains the bearing 40 on the second tubular portion 32. It would also be possible to make the retaining cap 60 of steel by stamping.

Referring now to FIG. 3, another embodiment of the eccentric drive means of the invention is shown which is designated generally by reference numeral 70. As in the previously described embodiments, the eccentric drive means 70 is mounted to a shaft 72 of a prime mover (not shown). Shaft 72 is rotatably supported in an anti-friction ball bearing 74, the outer race 76 of which is mounted in a bearing block or housing 78. The inner race 80 of bearing 74 is press fit onto a reduced diameter shaft portion 82 and bears against annular shoulder 84 of shaft 72.

An eccentric tubular sleeve 86 deep drawn from a hardenable steel material is press fit onto the reduced diameter shaft portion 82. As in the first embodiment, a retaining pin (not shown) may be used to secure the sleeve 86 to the shaft portion 82. Sleeve 86 is formed with a bore 88 having an axis 90 that coincides with the rotational axis of shaft 72. Sleeve 86 has an outer cylindrical periphery 92 with an axis 94 offset from axis 90 so that the outer periphery 92 moves eccentrically about axis 90 as shaft 72 rotates.

An anti-friction roller-bearing 96, having an outer race 91, a plurality of rollers 93 and a retainer or cage 95, is mounted on the outer periphery 92 of eccentric sleeve 86 such that the outer periphery 92 comprises the hardened inner race of the bearing 96. When the sleeve 86 is drawn, it is drawn with tabs or flanges 97, 98 which are bent outwardly. At least one tab or flange is bent over after the bearing 96 (including outer race 91, rollers 93 and retainer 95) has been slid axially onto the periphery 92 of the inner race. The flanges 97, 98 axially retain the bearing 96 on the sleeve 86.

According to the FIG. 3 embodiment, rotation of shaft 72 will cause the outer race 91 to rotate eccentrically so that the hardened outer periphery of outer race 91 may be used to reciprocate a plurality of radial pistons (not shown) of a radial piston pump or compressor.

FIG. 4 discloses a further embodiment of the eccentric drive means of the invention which is designated generally by reference numeral 100. In this embodiment, the eccentric drive means 100 comprises an eccentric tubular sleeve 102 deep drawn from a hardenable steel material. Sleeve 102 comprises the outer race of an anti-friction roller bearing 104 having rollers 106 in a retainer or cage 108. The sleeve 102 is provided with inwardly bent or inturned tabs or flanges 110, 112, at least one of which is bent inwardly after the caged rollers 106, 108 are axially slid onto the inner diameter of sleeve 102. The eccentric outer race or sleeve 102 is press fit into a bore 114 of a rotating member 116 rotatably driven by a prime mover (not shown) about axis 117. The rollers 106 of bearing 104 support a shaft 118 having an axis 120. The cylindrical shaft 118 thus comprises the inner race periphery 122 of the bearing 104. Shaft 118 has an annular groove 119 into which a spring clip retaining washer 121 engages to retain shaft 118 in the bearing 104.

As member 116 rotates about axis 117, the inner periphery 124 of outer race or sleeve 102 also rotates about axis 117. That rotation causes shaft 118 and its axis 120 to rotate eccentrically about axis 117. The eccentric movement of shaft 118 can be used to reciprocate a plurality of pistons disposed radially about axis 117. The reciprocating pistons may comprise the pistons of a radial piston pump or compressor 125.

From the foregoing description, it should be apparent that the present invention provides a simple and economical means for providing an eccentric drive means for radial piston pumps and compressors used to generate hydraulic or pneumatic fluid pressure.

Although certain presently preferred embodiments of the invention have been described herein, it will be apparent to those skilled in the art to which the invention pertains that variations and modifications of the described embodiments may be made without departing from the spirit and scope of the invention. Accordingly, it is intended that the invention be limited only to the extent required by the appended claims and the applicable rules of law.

What is claimed is:

1. An eccentric drive comprising at least one anti-friction bearing having an inner race and an outer race, a deep drawn tubular member having two cylindrical peripheries drawn and arranged eccentrically with respect to one another, one of said two cylindrical peripheries being fitted to a rotatable member for rotation therewith, the other of said two cylindrical peripheries comprising one of the inner or outer race of said at least one anti-friction bearing.

2. The eccentric drive of claim 1, wherein said eccentric drive is coupled to a plurality of pistons of a radial piston pump or compressor.

3. The eccentric drive of claim 2, wherein the outer race of the at least one anti-friction bearing is coupled to an radially drives said plurality of pistons.

4. The eccentric drive of claim 1, wherein said tubular member comprises a cup having a first tubular portion and a second tubular portion integrally formed eccentrically with the first tubular portion.

5. The eccentric drive of claim 4, wherein said rotating member is a shaft, said first tubular portion being fitted to the periphery of the shaft and the periphery of the second tubular portion comprising the inner race of the at least one anti-friction bearing.

6. The eccentric drive of claim 5, wherein said second tubular portion has an end cover, and means connected to said end cover for retaining the at least one anti-friction bearing on the second tubular portion.

7. The eccentric drive of claim 5, wherein said shaft has a free end terminating in said first tubular portion, said second tubular portion being hollow and extending axially beyond the free end of the shaft.

8. An eccentric drive comprising at least one anti-friction bearing having an inner race and an outer race, a deep drawn tubular member having two cylindrical peripheries arranged eccentrically with respect to one another, one of said two cylindrical peripheries being fitted to a rotatable member for rotation therewith, the other of said two cylindrical peripheries comprising one of the inner or outer race of said at least one anti-friction bearing, said tubular member comprising a cup having a first tubular portion and a second tubular portion integrally formed eccentrically with the first tubular portion, said rotating member comprising a shaft, said first tubular portion being fitted to the periphery of the shaft and the periphery of the second tubular portion comprising the inner race of the at least one anti-friction bearing, said second tubular portion having an end cover, and means connected to said end cover for retaining the at least one anti-friction bearing on the second tubular portion, said retaining means comprising a cap having an annular lip confronting said at least one anti-friction bearing, a hole in said end cover and resilient fingers on said cap engageable with said hole for securing the cap to the end cover.

9. The eccentric drive of claim 8, wherein said cap is a molded plastic part or a stamped metal part.

10. An eccentric device comprising a rotatable shaft having a free end, an anti-friction bearing having an inner race and an outer race, a tubular member having two integrally formed cylindrical tubular portions arranged eccentrically with respect to one another, a first one of said cylindrical tubular portions being fitted to and supported by the periphery of said shaft for rotation of said tubular member therewith, a second one of said cylindrical tubular portions being hollow and extending axially beyond the free end of said shaft, said second tubular portion having an outer periphery comprising the inner race of said anti-friction bearing.

11. The eccentric drive of claim 10, wherein said eccentric drive is coupled to a plurality of pistons of a radial piston pump or compressor.

12. The eccentric drive of claim 11, wherein the outer race of the anti-friction bearing is coupled to and radially drives said plurality of pistons.

13. The eccentric drive of claim 10, wherein said tubular member is a deep drawn steel member.

14. The eccentric drive of claim 10, including means for retaining said anti-friction bearing on said second tubular portion.

15. The eccentric drive of claim 14, wherein said retaining means comprises a spring clip retaining washer.

* * * * *

UNITED STATES PATENT AND TRADEMARK OFFICE
CERTIFICATE OF CORRECTION

PATENT NO. : 5,230,275
DATED : July 27, 1993
INVENTOR(S) : Bobby L. HODGE et al

It is certified that error appears in the above-indentified patent and that said Letters Patent is hereby corrected as shown below:

Title Page, "[75] Inventors:" the address of the second inventor should be --Herzogenaurach/Bayern, Federal Republic of Germany--.

"[73] Assignees:" the name of the first assignee should be --INA Waelzlager Schaeffler KG--.

"flow channels" should be --flow channel--.

Claim 3, column 5, line 6, "an" should be --and--.
Claim 10, column 6, line 11, "device" should be --drive--.

Signed and Sealed this

Twenty-third Day of November, 1993

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,230,275
DATED : July 27, 1993
INVENTOR(S) : Bobby L. Hodge et al

It is certified that error appears in the above-indentified patent and that said Letters Patent is hereby corrected as shown below:

Title page, "[75] Inventors:" the address of the second inventor should be --Herzogenaurach/Bayern, Federal Republic of Germany--.

Item [73] Assignees: the name of the first assignee should be --INA Waelzlager Schaeffler KG--.

Claim 3, column 5, line 6, "an" should be --and--.

Claim 10, column 6, line 11, "device" should be --drive--.

This certificate supersedes the Certificate of Correction issued on November 23, 1993.

Signed and Sealed this

Seventeenth Day of May, 1994

Attest:

BRUCE LEHMAN

*Attesting Officer*  *Commissioner of Patents and Trademarks*